United States Patent
Ladégourdie et al.

(10) Patent No.: US 11,230,623 B2
(45) Date of Patent: Jan. 25, 2022

(54) PHENOL RESIN FOR USE IN THE PHENOL RESIN COMPONENT OF A TWO-COMPONENT BINDER SYSTEM

(71) Applicant: HÜTTENES-ALBERTUS CHEMISCHE WERKE GESELLSCHAFT MIT BESCHRÄNKTER HAFTUNG, Düsseldorf (DE)

(72) Inventors: Gérard Ladégourdie, Düsseldorf (DE); Ursula Nitsch, Boppard (DE); Klaus Jenrich, Hemer (DE)

(73) Assignee: HÜTTENES-ALBERTUS CHEMISCHE WERKE GESELLSCHAFT MIT BESCHRÄNKTER HAFTUNG, Düsseldorf (DE)

( * ) Notice: Subject to any disclaimer, the term of this patent is extended or adjusted under 35 U.S.C. 154(b) by 234 days.

(21) Appl. No.: 16/472,700

(22) PCT Filed: Dec. 21, 2017

(86) PCT No.: PCT/EP2017/084267
§ 371 (c)(1),
(2) Date: Jun. 21, 2019

(87) PCT Pub. No.: WO2018/115382
PCT Pub. Date: Jun. 28, 2018

(65) Prior Publication Data
US 2019/0359762 A1 Nov. 28, 2019

(30) Foreign Application Priority Data
Dec. 23, 2016 (DE) .................. 10 2016 125 624.2

(51) Int. Cl.
| | |
|---|---|
| C08G 18/76 | (2006.01) |
| B22C 1/16 | (2006.01) |
| B22C 1/22 | (2006.01) |
| C08G 8/24 | (2006.01) |
| C08G 18/54 | (2006.01) |
| C08G 18/08 | (2006.01) |
| C08G 18/67 | (2006.01) |

(52) U.S. Cl.
CPC .......... *C08G 18/7671* (2013.01); *B22C 1/162* (2013.01); *B22C 1/2253* (2013.01); *B22C 1/2273* (2013.01); *C08G 8/24* (2013.01); *C08G 18/0852* (2013.01); *C08G 18/542* (2013.01); *C08G 18/6705* (2013.01)

(58) Field of Classification Search
CPC .... C08G 8/24; C08G 18/7671; C08G 18/542; C08G 18/0852; C08G 18/6705; B22C 1/162; B22C 1/2273; B22C 1/2253
See application file for complete search history.

(56) References Cited

U.S. PATENT DOCUMENTS

| | | |
|---|---|---|
| 3,409,579 A | 11/1968 | Robins |
| 3,485,797 A | 12/1969 | Robins |
| 4,546,124 A | 10/1985 | Laitar et al. |
| 4,590,229 A | 5/1986 | Gardikes |
| 6,136,888 A | 10/2000 | Torbus et al. |
| 6,465,542 B1 | 10/2002 | Torbus et al. |
| 9,238,264 B2 | 1/2016 | Ladégourdie et al. |
| 9,493,602 B2 | 11/2016 | Cornelissen et al. |
| 2011/0005702 A1 | 1/2011 | Priebe |
| 2013/0299120 A1 | 11/2013 | Priebe |
| 2017/0282239 A1 | 10/2017 | Lenzen |
| 2018/0126449 A1 | 5/2018 | Vargas et al. |

FOREIGN PATENT DOCUMENTS

| | | |
|---|---|---|
| DE | 102004057671 | 6/2006 |
| GB | 1575366 | 9/1980 |
| JP | 2003136184 | 5/2003 |
| JP | 2015196707 | 11/2015 |
| WO | 2008017476 | 2/2008 |

OTHER PUBLICATIONS

Pilato, L., "Phenolic Resins: A Century of Progress," Springer-Verlag Berlin Heidelberg 2010, pp. 57, 139-143, 476-479, 482-487, 500-502; ISBN 978-3-642-04713-8.
Astarloa-Aierbe, G., et al., "Kinetics of phenolic resol resin formation by HPLC. III: Zinc acetate," Polymer 40 (1999) 5873-5878.
Wikipedia, Stichwort "Phenol formaldehyde resin," https://en.wikipedia.org/wiki/Phenol_formaldehyde_resin.

*Primary Examiner* — Patrick D Niland
(74) *Attorney, Agent, or Firm* — Duane Morris LLP; Gregory M. Lefkowitz; Brandon A. Chan

(57) ABSTRACT

The present invention relates to a phenolic resin for use in the phenolic resin component of a two-component binder system for the polyurethane cold box process, to a two-component binder system for use in the polyurethane cold box process, to a molding material mixture for curing by contacting with a tertiary amine, to the use of a corresponding phenolic resin, of a corresponding phenol component, of a corresponding two-component binder system or of a corresponding molding material mixture. The present invention relates, moreover, to an article from the group consisting of feeders, foundry molds and foundry cores, producible from a corresponding molding material mixture, to a process for preparing a phenolic resin, and to a process for producing an article from the group consisting of feeders, foundry molds and foundry cores.

20 Claims, No Drawings

PHENOL RESIN FOR USE IN THE PHENOL RESIN COMPONENT OF A TWO-COMPONENT BINDER SYSTEM

CROSS-REFERENCE TO RELATED APPLICATIONS

This application is a § 371 national stage entry of International Application No. PCT/EP2017/084267, filed on Dec. 21, 2017, which claims priority to German Patent Application No. 10 2016 125 624.2, filed on Dec. 23, 2016, the entire contents of which are incorporated herein by reference.

The present invention relates to a phenolic resin for use in the phenolic resin component of a two-component binder system for the polyurethane cold box process, to a two-component binder system for use in the polyurethane cold box process, to a molding material mixture for curing by contacting with a tertiary amine, to the use of a corresponding phenolic resin, of a corresponding phenol component, of a corresponding two-component binder system or of a corresponding molding material mixture. The present invention relates, moreover, to an article from the group consisting of feeders, foundry molds and foundry cores, producible from a corresponding molding material mixture, to a process for preparing the phenolic resin, and to a process for producing an article from the group consisting of feeders, foundry molds and foundry cores.

In the production of feeders, foundry molds and foundry cores, the mold base material is often bound using two-component binder systems which are cold-curing with formation of polyurethane. These binder systems consist of two components: a phenolic resin in solution in a solvent and having at least two OH groups in the molecule (phenolic resin component), and an isocyanate in solution in a solvent or solvent-free and having at least two isocyanate groups in the molecule (isocyanate component). In the shaped molding material mixture, the two components, added separately to the molding material mixture comprising a mold base material, react in an addition reaction to form a cured polyurethane binder. This curing takes place in the presence of basic catalysts, preferably in the form of tertiary amines, which are introduced into the shaping mold with a carrier gas after the molding material mixture has been shaped.

The phenolic resin component is a phenolic resin in solution in a solvent, i.e., a condensation product of one or more (optionally substituted) phenols with one or more aldehydes (particularly formaldehyde). Because of the high viscosity of the phenolic resins it is necessary for the phenolic resins of the phenolic resin component to be dissolved in a solvent, since otherwise there is no possibility for further processing. In particular, homogeneous mixing of the phenolic resin component with the isocyanate component and the mold base material would be impossible or possible only with considerable extra effort. Moreover, the dissolution of the phenolic resin lowers the reactivity with the isocyanate component, and so the reaction does not begin before the catalyst is added. Accordingly, the phenolic resin component is customarily in the form of a solution having a phenolic resin concentration in the range from 40% to 60%, based on the total mass of the phenolic resin component.

The isocyanate component used is an isocyanate (usually polyisocyanate) having at least two isocyanate groups in the molecule, in undissolved form or in solution in a solvent. Preferred are aromatic isocyanates (usually polyisocyanates). In the case of an isocyanate component in the form of a solution, the concentration of the isocyanate is generally above 70%, based on the total mass of the isocyanate component.

For the production of feeders, foundry cores and foundry molds by the polyurethane cold box process (also termed "Urethane Cold Box process"), a molding material mixture is first of all prepared, by the mixing of a granular mold base material with the two components of the above-described two-component binder system. The proportions of the two components of the two-component binder system here are preferably made such as to result, based on the number of OH groups, in a virtually stoichiometric proportion or an excess of the NCO groups. Two-component binder systems customary at present typically have an excess of NCO groups of up to 20%, based on the number of OH groups. The total amount of binder (including the additives and solvents present in the binder components) is customarily in the range from around 1% to 2% in the case of foundry cores and foundry molds, based on the mass of mold base material employed, and customarily in the range from around 5% to 18% in the case of feeders, based on the other constituents of the feeder composition.

The molding material mixture is then shaped. This is followed, with brief gassing with a tertiary amine as catalyst, by the curing of the shaped molding material mixture. The required amount of catalyst in the form of tertiary amine is in the range from 0.035% to 0.11%, based in each case on the mass of mold base material employed. Based on the mass of binder, the amount of catalyst required, in the form of tertiary amine, is typically 3% to 15%, depending on the nature of the tertiary amine used. Subsequently the feeder, the foundry core or the foundry mold can be taken from the shaping mold and used for the casting of metal, such as in engine casting, for example.

Two-component binder systems which are cold-curing with formation of polyurethane, as described above, are also used in the polyurethane no-baked process. In that process, curing takes place with exposure to a liquid catalyst in the form of a solution of a tertiary amine which is added to the molding material mixture.

WO 2016/165916 A1 describes a phenolic resin composition for use in the polyurethane cold box and/or no-bake process. The phenolic resin composition described comprises an ortho-fused phenolic resole having etherified and/or free methylol groups, free formaldehyde, one or more reaction products of formaldehyde with one or more C—H-acidic reactant compounds, and other constituents. An ortho-fused phenolic resole described in that document has the formula reproduced below, the resole being obtained by condensation of a single phenol, so that all radicals R are the same. In the formula reproduced above, R corresponds to hydrogen or a substituent in meta- or para-position to the phenolic hydroxyl group.

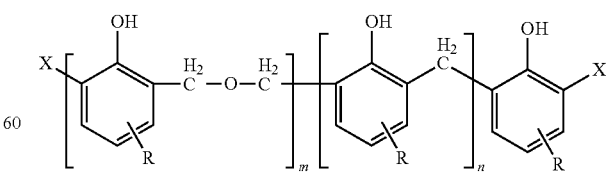

Two-component binder system for use in the polyurethane cold box process are described for example in U.S. Pat. Nos. 3,409,579, 4,546,124, DE 10 2004 057 671, EP 0 771 599, EP 1 057 554, and DE 10 2010 051 567.

In the selection of the solvents for the phenolic resin component and where appropriate for the isocyanate component, it should be borne in mind that the solvents, while taking no relevant part in the reaction between the isocyanate and the phenolic resin in the presence of a catalyst, may nevertheless certainly influence this reaction. One problem in particular is the fact that the two binder components, phenolic resin and isocyanate, possess a markedly different polarity. This difference in polarity between the isocyanate and the phenolic resin limits the number of solvents that can be used to those which are compatible with both binder components. Such compatibility is necessary in order to achieve complete reaction and curing of a binder system. Polar solvents of the protic or aprotic type, while generally being good solvents for the phenolic resin, are of only little suitability for the isocyanate. Aromatic solvents, in turn, are indeed compatible with isocyanates, but have only low suitability for phenolic resins. Aromatic solvents have the disadvantage, furthermore, of releasing harmful substances after casting, such as benzene, xylene or toluene.

In practice, therefore, it is customary to use mixtures of polar and apolar, aromatic-containing solvents which have been tailored to the particular binder system (phenolic resin and isocyanate). The individual constituents of the solvent mixture here are in any case not to have an excessively low boiling range so that the solvent—particularly when hot sand is being used—evaporates too quickly, with the consequence of a reduction in the fluidity and compactability of the sand.

As apolar, aromatic-containing solvents it has to date been preferred to use mixtures of high-boiling aromatic hydrocarbons, i.e., mixtures of aromatic hydrocarbons having a boiling range above about 150° C. at atmospheric pressure. Polar solvents employed have included certain sufficiently high-boiling esters, such as mixtures of dimethyl adipate, dimethyl succinate and dimethyl glutarate, also known in the trade as DBE (Dibasic Ester).

For economic and environmental reasons it is advantageous to prevent or reduce the emissions arising in foundries due to organic solvents. The emissions during casting, but also vaporous and gaseous emissions prior to casting, constitute a considerable workplace burden, which usually cannot be captured by protective measures such as fume hoods or the like.

DE 1 999 125 115 A1 proposes the use of alkyl silicates. By this means it is possible in particular to achieve a considerable reduction in harmful emissions after casting. Because of the low polarity of alkyl silicates, however, it has to date not been possible to do entirely without the addition of polar, organic solvents, since the phenolic resins used to date do not have sufficient miscibility with alkyl silicates.

It is therefore the object of the present invention to specify a phenolic resin, for use in the phenolic resin component of a two-component binder system for the polyurethane cold box process, that exhibits improved miscibility or solubility with apolar solvents, especially alkyl silicates, with no adverse effect on the other properties of the phenolic resin, of the two-component binder system produced from it, or of the articles or molding material mixture produced from the two-component binder system.

This object is achieved by means of a phenolic resin for use in the phenolic resin component of a two-component binder system for the polyurethane cold box process, wherein the phenolic resin comprises:

(a) a resole having the following structural units:

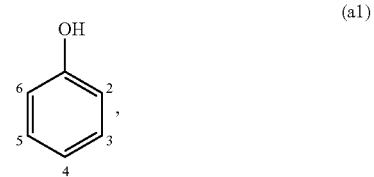

where at one, two or three of the positions 2, 4 and 6, instead of a bond to hydrogen, there is a bond to a further structural unit of the resole, (a2) one or more structural units of the formula (A2)

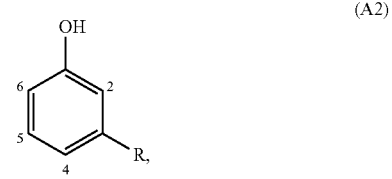

where the substituent R is an (a2-i) substituted or unsubstituted, (a2-ii) aliphatic, (a2-iii) branched or unbranched, (a2-iv) saturated or unsaturated radical having a total of 1 to 35 carbon atoms, including any substituents, and where at one, two or three of the positions 2, 4 and 6, instead of a bond to hydrogen, there is a bond to a further structural unit of the resole, (a3) one or more structural units of the formula (A3)

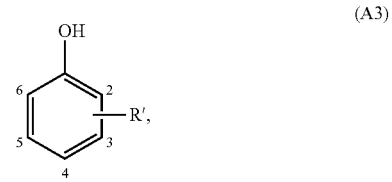

where the substituent R' is substituted at position 2 or 4 and is an (a3-i) substituted or unsubstituted, (a3-ii) aliphatic, (a3-iii) branched or unbranched, (a3-iv) saturated or unsaturated radical having a total of 1 to 15 carbon atoms, including any substituents, and where at one, two or three of the remaining positions 2, 4 and 6, instead of a bond to hydrogen, there is a bond to a further structural unit of the resole,

as a link connecting two phenol rings,

as a link connecting two phenol rings.

It has surprisingly emerged that phenolic resins of the invention exhibit very high miscibility or solubility in apolar solvents. Where the phenolic resins of the invention are used in the phenolic resin component of a two-component binder system for the polyurethane cold box process, it is then possible accordingly to do entirely without organic polar solvents. The phenolic resins of the invention, in the mixtures required for the production of phenolic resin components of two-component binder systems for the polyurethane cold box process, are very highly miscible with alkyl silicates, such as tetraetyl silicate, with no observed hazing of the solution.

Through the use of phenolic resins of the invention it is therefore possible to reduce or rule out the emission of aromatic solvents.

Moreover it is surprisingly possible, for dissolving the phenolic resin, to use apolar solvents which at the same time also represent good solvents for isocyanates (especially polyisocyanates). Hence it is possible to do without the use of solvent mixtures composed of polar and apolar solvents.

Preferred in accordance with the invention is a phenolic resin wherein, in the resole of constituent (a), the molar ratio of the structural units a1 to a2 is in the range from 10:1 to 99:1, preferably from 15:1 to 50:1,
and/or
a1 to a3 is in the range from 1:1 to 10:1, preferably in the range from 1.5:1 to 3.5:1,
and/or
a2 to a3 is in the range from 5:1 to 30:1, preferably from 10:1 to 20:1,
and/or
a4 to a5 is in the range from 90:10 to 10:90.

Further preferred is a phenolic resin of the invention wherein the fraction of the resole of the constituent (a) is in the range from 30 to 75 wt %, based on the total mass of the phenolic resin. In the phenolic resin of the invention, for example, there may be further resoles or novolac as well as the resole of the invention, or the phenolic resin of the invention includes a fraction of free monomers.

Likewise preferred is a phenolic resin of the invention, further comprising
(b) a fraction of free aromatic monomers, preferably a fraction in the range from 0 to 20 wt %, preferably 0 to 10 wt % and more preferably 0 to 1.9 wt %, based on the total mass of the phenolic resin
and/or
(c) a fraction of formaldehyde, preferably a fraction in the range from 0 to 1.0 wt %, preferably 0.0 to 0.2 wt %, more preferably 0.0 to 0.02 wt %, based on the total mass of the phenolic resin
and/or
(d) a fraction of a further resole or novolac, preferably a fraction in the range between 0 and 50 wt %, based on the total mass of the phenolic resin.

Likewise preferred in accordance with the invention is a phenolic resin wherein the substituent R of the structural units of the formula (A2) is a radical having 5 to 15 carbon atoms.

Preferred in accordance with the invention is a phenolic resin
wherein the substituent R in the structural unit or at least in one of the structural units of the formula (A2) is an (a2-i) unsubstituted, (a2-ii) aliphatic, (a2-iii) unbranched radical having a total of 1 to 35 carbon atoms, preferably having a total of 5 to 15 carbon atoms,
and/or
wherein the substituent R in the structural unit or at least in one of the structural units of the formula (A2) is (a2-iv) mono- or polyunsaturated, preferably mono-, di- or triunsaturated.

Preference here is given to a phenolic resin of the invention wherein the substituent R in the structural unit or at least in one of the structural units of the formula (A2) is an (a2-i) unsubstituted, (a2-ii) aliphatic, (a2-iii) unbranched radical having a total of 15 carbon atoms which (a2-iv) is triunsaturated, where double bonds are disposed preferably in positions 8, 11 and 14.

It is particularly preferred in accordance with the invention if the structural units of the formula (A2) is one or more structural units of the formula (A2-A):

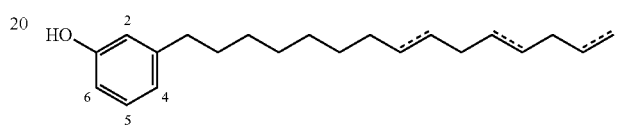

(A2-A)

where one, two or all of the bonds shown with dashes represents a double bond.

It is further preferred in accordance with the invention if, in a resole of the invention, the structural unit (a2) consists of different structural units of the formula (A2-A), where one, two or all of the bonds shown with dashes represents a double bond.

It is particularly preferred in accordance with the invention if a structural unit or the one structural units of the formula (A2) is a structural unit of the formula (A2-B):

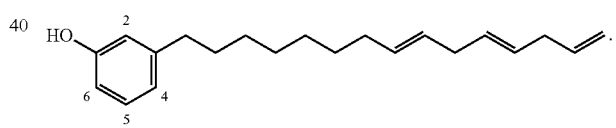

(A2-B)

These preferred phenols of the invention are notable for particularly ready solubility in apolar solvents. Surprisingly the solutions exhibit particularly low viscosity even with only little addition of solvent.

Likewise preferred in accordance with the invention is a phenolic resin wherein the substituent R' of the structural units of the formula (A3) is a radical having 1 to 9 carbon atoms.

Preferred in accordance with the invention is a phenolic resin
wherein the substituent R' in the structural unit or at least in one of the structural units of the formula (A3) is disposed in ortho-position to the phenolic OH
and/or
wherein the substituent R' in the structural unit or at least in one of the structural units of the formula (A3) is an (a3-i) unsubstituted, (a3-iii) branched or unbranched, (a3-iv) saturated alkyl radical having preferably 1 to 9 carbon atoms, more preferably having 1, 4, 8 or 9 carbon atoms.

Preferred in accordance with the invention is a phenolic resin wherein the substituent R' in the structural unit or at least in one of the structural units of the formula (A3) is disposed in ortho-position to the phenolic OH, and the substituent R' represents a methyl group.

Especially preferred in accordance with the invention is a phenolic resin for use in the phenolic resin component of a two-component binder system for the polyurethane cold box process, wherein the phenolic resin comprises:

(a) a resole having the following structural units:

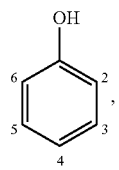
(a1)

where at one, two or three of the positions 2, 4 and 6, instead of a bond to hydrogen, there is a bond to a further structural unit of the resole, (a2) one or more structural units of the formula (A2-A)

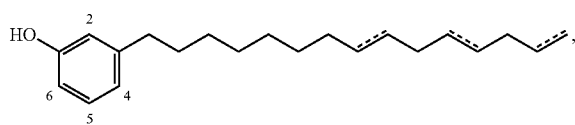
(A2-A)

where one, two or all of the bonds shown with dashes represents a double bond and where at one, two or three of positions 2, 4 and 6, instead of a bond to hydrogen, there is a bond to a further structural unit of the resole, (a3) one or more structural units of the formula (A3-A)

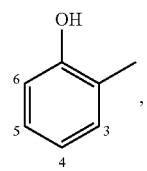
(A3-A)

where at one, two or three of the positions 2, 4 and 6, instead of a bond to hydrogen, there is a bond to a further structural unit of the resole,

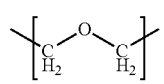
(a4)

as a link connecting two phenol rings,

(a5)

as a link connecting two phenol rings.

Especially preferred in accordance with the invention is a phenolic resin for use in the phenolic resin component of a two-component binder system for the polyurethane cold box process, wherein the phenolic resin comprises:

(a) a resole prepared by the polycondensation of:

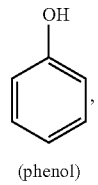
(a1)

(phenol)

(a2) one or more compounds of the formula (I)

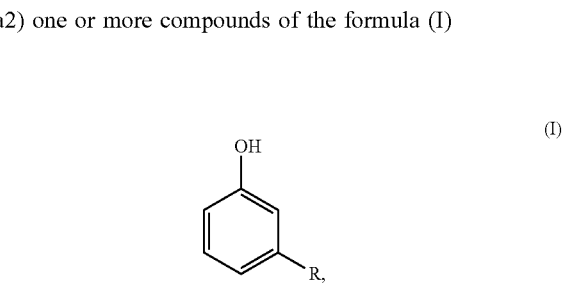
(I)

wherein the substituent R is an (a2-i) substituted or unsubstituted, (a2-ii) aliphatic, (a2-iii) branched or unbranched, (a2-iv) saturated or unsaturated radical having a total of 1 to 35 carbon atoms, including any substituents, and (a3) one or more compounds of the formula (II)

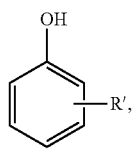
(II)

where the substituent R' is substituted in position 2 or 4 and is an (a3-i) substituted or unsubstituted, (a3-ii) aliphatic, (a3-iii) branched or unbranched, (a3-iv) saturated or unsaturated radical having a total of 1 to 15 carbon atoms, including any substituents, and and formaldehyde.

In accordance with the invention the polycondensation of the phenols with formaldehyde takes place preferably in a weakly acidic medium, using suitable metal catalysts. Suitable metal catalysts are salts of divalent ions of metals such as Mn, Zn, Cd, Mg, Co, Ni, Fe, Pb, Ca, and Ba. Preferred for use is zinc acetate, which is customarily employed in the form of zinc acetate dihydrate. The amount employed is not critical. Typical amounts of zinc acetate dihydrate are 0.02 to 0.3 wt %, preferably 0.02 to 0.2 wt %, based on the total amount of phenols and formaldehyde.

The embodiments of the radicals R and R' identified earlier on above as preferred, in the structural units of the formulae (A2) and (A3), are valid for the compounds (I) and (II) correspondingly.

With particular preference the compound of the formula (I) is a compound of the formula (I-A)

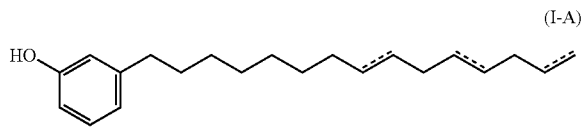

where one, two or all of the bonds shown with dashes represents a double bond.

Especially preferably the compound of the formula (I) is a compound of the formula (I-B)

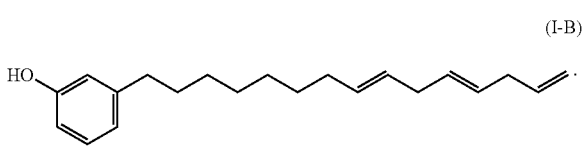 [SMILES: C=CC/C=C/C/C=C/CCCCCCCc1cccc(O)c1]

Especially preferably the compound of the formula (I) is cardanol.

Very preferably the compound of the formula (II) is a compound of the formula (II-A)

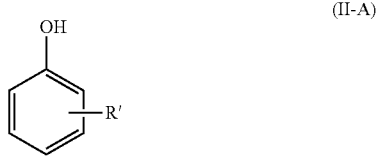

where the substituent R' in the structural unit or at least in one of the structural units of the formula (II-A) is disposed in ortho-position to the phenolic OH and/or wherein the substituent R' in the structural unit or at least in one of the structural units of the formula (II-A) is an (a3-i) unsubstituted, (a3-iii) branched or unbranched, (a3-iv) saturated alkyl radical, having preferably 1 to 9 carbon atoms, more preferably having 1, 4, 8 or 9 carbon atoms.

Especially preferably the compound of the formula (II) is ortho-cresol.

To make it clear it may be pointed out, looking at the disclosure content of the document WO2016/165916 A1, that compounds of the formula depicted below

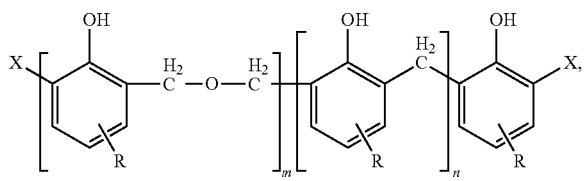

where uniformly each R is hydrogen or a substituent in meta- or para-position to the phenolic hydroxyl group, such as, for example, methyl, n-butyl, isobutyl, tert-butyl, octyl, nonyl, pentadecenyl, pentadecadienyl and pentadecatrienyl, and the sum totals of m and n is at least 2 and the ratio m/n is at least 1, and X is hydrogen, $CH_2OH$ or an etherifying methylol group, are not in accordance with the invention.

A further aspect of the present invention relates to a phenolic resin component for use as a component of a two-component binder system for the polyurethane cold box process, comprising a phenolic resin of the invention and also a solvent for the phenolic resin.

Preferred in accordance with the invention is a phenolic resin component wherein the solvent is selected from the group consisting of alkyl silicates, alkyl silicate oligomers, alkyl silicate polymers, C10-C13-alkylbenzenes, isoparaffins, aromatic hydrocarbons, aliphatic hydrocarbons, and mixtures comprising at least one of these compounds, and/or wherein the solvent is selected such that the phenolic resin at 25° C. is miscible with the solvent in a weight ratio between phenolic resin and solvent of 7:3 to 3:7, preferably 6:4 to 4:6, more preferably 5.5:4.5 to 4.5:5.5, and forms a homogeneous solution.

Specified below—beginning with the preferred tetraethyl (ortho)silicate—are a series of particularly preferred alkyl silicates, alkyl silicate oligomers, alkyl silicate polymers:

Tetraalkyl silicates: tetraethyl (ortho)silicate; tetra-n-propyl silicate; tetrabutyl glycol silicate Trialkyl silicates: triethyl silicate; trialkyl silicates (especially triethyl silicates) with aryl functionality on the fourth oxygen atom (Si—O—Ar; Ar=aryl radical)

Dialkyl silicates: diethyl silicate; dialkyl silicates with aryl functionality on the third and/or fourth oxygen atom (Si—O—Ar)

Monoalkyl silicates: monoethyl silicate; monoalkyl silicates with aryl functionality on the second and/or third and/or fourth oxygen atom (Si—O—Ar)

Substituted Silicates:
(a) aryl- or alkyl-alkoxy-silanes, i.e., compounds of the type R1 n=1-3Si(OR2)m=4-n with R1=alkyl or aryl radical, and R2=alkyl radical; e.g.,
(b) organofunctional silanes, i.e., compounds of the type R1 n=1-3Si(OR2)m=4-n with R1 functional group such as 3-aminopropyl or 3-ureidopropyl or 3-glycidyloxypropyl and R2=alkyl radical; e.g., 3-aminopropyl-triethoxysilane, 3-ureidopropyl-triethoxysilane or 3-glycidyl-oxypropyl-trimethoxysilane Ethyl polysilicates: ethyl esters of polysilicic acid or oligosilicic acids, mixtures of ethyl esters of different polysilicic acids or oligosilicic acids, preferably with an $SiO_2$ fraction of more than 35 wt %, preferably more than 39 wt %, more preferably in a range from 40 to 42 wt % (the $SiO_2$ content may be determined according to AN-SAA 0851).

In particular, ethyl esters of polysilicic acid or oligosilicic acids and mixtures thereof are notable for a high flash point. Solvents having a high flash point are preferred, since they enable an improvement in the operational safety.

As well as or alternatively to the apolar solvents stated above, solvents used may also include compounds selected from the group consisting of fatty acid alkyl esters, preferably fatty acid methyl esters, more preferably vegetable oil methyl esters, more preferably grapeseed oil methyl ester, tall oil esters alkylene carbonates, preferably propylene carbonate, cycloalkanes cyclic formals and C2 to C6 dicarboxylic acids, for example, 1,2-ethanedioic acid (oxalic acid, C2-dicarboxylic acid), 1,3-propanedioic acid (malonic acid, C3-dicarboxylic acid), 1,4- butanedioic acid (succinic acid, C4-dicarboxylic acid), 1,5 pentanedioic acid (glutaric acid, C5-dicarboxylic acid) or 1,6-hexanedioic acid (adipic acid, C6-dicarboxylic acid); dialkyl esters of $C_4$-$C_6$-dicarboxylic acids are particularly preferred, especially dimethyl esters of $C_4$-$C_6$-dicarboxylic acids (such mixtures are known to the skilled person as so-called "dibasic ester" or "DBE").

Likewise preferred in accordance with the invention is a phenolic resin component wherein the solvent is present in an amount in the range from 30 to 70 wt %, preferably in the range from 40 to 60 wt %, more preferably in the range from 45 to 55 wt %, based on the total amount of the phenolic resin component.

Because of the ready solubility of the phenolic resin of the invention in apolar solvents, the phenolic resin components of the invention exhibit particularly good storage stability. Even at temperatures between −15 and 0° C. there is no hazing of the solution.

Preferred in accordance with the invention is a phenolic resin component wherein the phenolic resin component possesses a viscosity at 20° C. of less than 1000 mPa·s, preferably less than 500 mPa·s, especially preferably less than 150 mPa·s.

It has emerged from our own studies that in the case of phenolic resin components of the invention it is possible to obtain a particularly low viscosity. A low viscosity improves the workability of the phenolic resin components and promotes homogeneous mixing during the production of a molding material mixture.

A further aspect of the present invention relates to a two-component binder system for use in the polyurethane cold box process, comprising a phenolic resin component and a separate isocyanate component (preferably polyisocyanate component), wherein the phenolic resin component comprises a phenolic resin of the invention and/or is a phenolic resin component of the invention.

A further aspect of the present invention relates to a molding material mixture for curing by contacting with a tertiary amine or a mixture of two or more tertiary amines, wherein the molding material mixture is producible by mixing components of the two-component binder system of the invention.

With preference in accordance with the invention the amine used for curing the molding material mixture in the polyurethane cold box process is either triethylamine, dimethylethylamine, diethylmethylamine, dimethylisopropylamine, dimethylpropylamine, or a mixture of the aforesaid amines.

Preferred in accordance with the invention is a molding material mixture further comprising a mold base material or a mixture of two or more mold base materials, wherein the ratio of the total mass of mold base materials to the total mass of other constituents of the molding material mixture is in the range from 100:10 to 100:0.4, preferably from 100:3 to 100:0.5, and more preferably from 100:1.5 to 100:0.6.

A further aspect of the present invention relates to the use of a phenolic resin of the invention, of a phenolic resin component of the invention, of a two-component binder system of the invention or of a molding material mixture of the invention for binding a mold base material or a mixture of mold base materials in the polyurethane cold box process.

A further aspect of the present invention relates to an article from the group consisting of feeders, foundry molds and foundry cores, producible from a molding material mixture of the invention.

Surprisingly it has emerged that through the use of articles of the invention it is possible to reduce or avoid entirely the emission, arising during casting, of aromatics such as benzene, xylene or toluene, if the aromatic solvents customarily used are replaced in part or entirely by alkyl silicates.

Articles, such as feeders, foundry molds and foundry cores, which are produced from molding material mixtures customarily require a measurable strength during the gassing itself (this strength being referred to as "initial strength" or "instantaneous strength") and slowly increasing, after the end of the gassing, to the ultimate strength values. In practice the desire is for extremely high initial strengths, to allow the articles to be taken from the shaping mold as soon as possible after gassing, and to leave the shaping mold available again for a new operation. Particularly in the case of automated removal and further processing of the articles produced from the molding material mixture, by means of a robot, it has proven advantageous if the articles have not only the strength but also a high elasticity. Because the robot arms customarily used lack sufficient sensitivity and are therefore unable to respond to very small deviations in the article produced or in its position, a frequent occurrence is that the articles produced are destroyed by the robot arm if the article lacks sufficient elasticity enabling it to compensate the imprecision of the robot.

Surprisingly it has emerged that the articles of the invention produced from molding material mixtures of the invention exhibit a high initial strength, also "instantaneous strength", in conjunction with high elasticity (high fracture displacement). As a result, the articles of the invention produced from molding material mixtures of the invention have a decisive advantage. The articles of the invention produced from molding materials of the invention can be automatically withdrawn and further-processed, and the rejects arising as a result of crushing of the articles can be significantly reduced.

To produce the article, the components of the two-component binder system are first of all mixed with a (refractory) mold base material to give a molding material mixture. If the molding is to be produced by the PU no-bake process, a suitable catalyst may also be added to the molding material mixture itself.

Added preferably for this purpose to the molding material mixture are liquid amines. These amines preferably have a pKb of 4 to 11. Examples of suitable catalysts are 4-alkylpyridines, where the alkyl group comprises 1 to 4 carbon atoms, isoquinoline, arylpyridines, such as phenylpyridine, pyridine, acryline, 2-methoxypyridine, pyridazine, quinoline, n-methylimidazole, 4,4'-bipyridine, phenylpropylpyridine, 1-methylbenzimidazole, 1,4-thiazine, N,N-dimethylbenzylamine, tribenzylamine, N,N-dimethyl-1,3-propanediamine, N,N-dimethylethanolamine, and triethanolamine. The catalyst may optionally be diluted with an inert solvent, as for example 2,2,4-trimethyl-1,3-pentanediol diisobutyrate, or with a fatty acid ester. The amount of catalyst added is selected in the range from 0.1 to 15 wt %, based on the weight of the polyol component.

The molding material mixture is then introduced with customary means into a mold, where it is compacted. The molding material mixture is subsequently cured to form an article. In the course of curing, the article ought preferably to retain its external shape.

In the production of foundry cores in particular it is necessary for the foundry cores to be connected to one another or to the foundry mold. This connecting is frequently accomplished by means of metal pins, which are shot into the cores and connect them to one another. It has surprisingly emerged that the articles of the invention produced from molding material mixtures of the invention fracture less frequently on further processing and particularly during connection with metal pins, owing to the increased elasticity.

A further aspect of the present invention relates to a process for producing a phenolic resin, comprising the following steps:

(A) providing or preparing phenol, (B) providing or preparing one or more compound having the general formula (I)

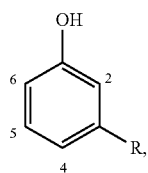

(I)

where the substituent R is an (a2-i) substituted or unsubstituted, (a2-ii) aliphatic, (a2-iii) branched or unbranched, (a2-iv) saturated or unsaturated radical having a total of 1 to 35 carbon atoms, including any substituents, (C) providing or preparing one or more compound having the general formula (II)

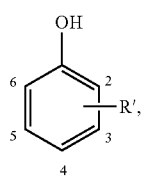

(II)

where the substituent R' is substituted at position 2 or 4 and is an (a3-i) substituted or unsubstituted, (a3-ii) aliphatic, (a3-iii) branched or unbranched, (a3-iv) saturated or unsaturated radical having a total of 1 to 12 carbon atoms, including any substituents, (D) providing or preparing formaldehyde, and (E) incorporating by condensation the compounds provided or prepared in steps (A) to (D).

A further aspect of the present invention relates to a phenolic resin produced by a process of the invention for producing a phenolic resin.

A further aspect of the present invention relates to processes for producing an article from the group consisting of feeders, foundry molds and foundry cores, with the steps of:

providing or producing a mold base material or a mixture of two or more mold base materials, mixing the mold base material or the mixture of two or more mold base materials with the phenolic resin component and the isocyanate component (or polyisocyanate component) of a two-component binder system of the invention, to form a molding material mixture suitable for curing by contacting with a gaseous tertiary amine or with a mixture of two or more gaseous tertiary amines, shaping the molding material mixture, contacting the shaped molding material mixture with a gaseous tertiary amine or with a mixture of two or more gaseous tertiary amines by the polyurethane cold box process, so that the shaped molding material mixture cures to form the article from the group consisting of feeders, foundry molds or foundry cores.

In the context of the present invention, it is preferred for two or more of the aspects identified above as being preferred to be realized at the same time; especially preferred are the combinations of such aspects and the corresponding features that are evident from the appended claims.

The invention is elucidated further below by means of examples.

EXAMPLE 1: PREPARATION OF AN INVENTIVE PHENOLIC RESIN

A reaction vessel fitted with condenser, thermometer and stirrer was charged with the following:
20 parts by weight of phenol
15 parts by weight of ortho-cresol
0.025 part by weight of zinc acetate dihydrate
0.015 part by weight of zinc stearate.

The condenser was set to reflux. The temperature was brought, rising continuously over the course of an hour, to 110° C. and was maintained at this temperature.

Over a period of 90 minutes, 17 parts by weight of paraformaldehyde (91%) were added in 20 portions.

The reaction mixture is subsequently stirred further and 3.0 parts by weight of cardanol are added. The reaction mixture is heated at 110° C. for a further 30 minutes.

Subsequently the condenser was changed over to an atmospheric distillation and the temperature was raised over the course of an hour to 125-126° C., causing the distillative removal of the volatile constituents from the product solution.

Thereafter there was a vacuum distillation, in which the remaining volatile constituents were removed.

The phenolic resin of the invention is attained in a yield of around 80%.

EXAMPLE 2: PREPARATION OF A NONINVENTIVE PHENOLIC RESIN

A reaction vessel fitted with condenser, thermometer and stirrer was charged with the following:
20 parts by weight of phenol
15 parts by weight of ortho-cresol
0.025 part by weight of zinc acetate dihydrate
0.015 part by weight of zinc stearate.

The condenser was set to reflux. The temperature was brought, rising continuously over the course of an hour, to 110° C. and was maintained at this temperature.

Over a period of 90 minutes, 17 parts by weight of paraformaldehyde (91%) were added in 20 portions.

The reaction mixture is subsequently heated at 110° C. for a further 30 minutes.

Subsequently the condenser was changed over to an atmospheric distillation and the temperature was raised over the course of an hour to 125-126° C., causing the distillative removal of the volatile constituents from the product solution.

Thereafter there was a vacuum distillation, in which the remaining volatile constituents were removed.

A phenol/o-cresol resin is attained in a yield of around 80%.

EXAMPLE 3: PREPARATION OF A NONINVENTIVE PHENOLIC RESIN

A reaction vessel fitted with condenser, thermometer and stirrer was charged with the following:

33 parts by weight of phenol
0.025 part by weight of zinc acetate dihydrate
0.015 part by weight of zinc stearate.

The condenser was set to reflux. The temperature was brought, rising continuously over the course of an hour, to 110° C. and was maintained at this temperature.

Over a period of 90 minutes, 17 parts by weight of paraformaldehyde (91%) were added in 20 portions.

The reaction mixture is subsequently heated at 110° C. for a further 30 minutes.

Subsequently the condenser was changed over to an atmospheric distillation and the temperature was raised over the course of an hour to 125-126° C., causing the distillative removal of the volatile constituents from the product solution.

Thereafter there was a vacuum distillation, in which the remaining volatile constituents were removed.

A phenolic resin is attained in a yield of around 80%.

EXAMPLE 4: DETERMINATION OF THE MISCIBILITY OF THE RESINS PREPARED IN EXAMPLES 1 TO 3 WITH TETRAETHYL SILICATE 100 g of the resin for testing were charged to a glass beaker and tetraethyl silicate was added in portions until the resulting resin solution was found to be hazy at 25° C. Here it was ensured that after each addition of a portion of tetraethyl silicate, stirring took place for long enough to produce a homogeneous solution.

After the addition of the first portions of tetraethyl silicate, the resulting mixture was heated to 60° C. and cooled back to 25° C. before the subsequent addition. The addition of portions of the tetraethyl silicate was repeated multiply until hazing of the resin was observed that could not be eliminated even by sufficiently long (>90 minutes) stirring of the solution at 25° C.

The measurement was repeated three times and the average was formed.

The results are reported in table 1 below:

| Resin | Maximum miscibility: 100 g phenolic resin with a maximum of x g tetraethyl silicate (TEOS)* at 25° C. |
|---|---|
| From example 1 | 150 g TEOS/100 g phenolic resin |
| From example 2 | 100 g TEOS/100 g phenolic resin |
| From example 3 | 66 g TEOS/100 g phenolic resin |

*The limit of miscibility is considered to be reached when the mixture turns hazy.

From the results it is apparent that the inventive phenolic resin from example 1 exhibits a higher miscibility with tetraethyl silicate than the noninventive phenolic resins from examples 2 and 3.

EXAMPLE 5: DETERMINATION OF FRACTURE FORCE, FRACTURE DISPLACEMENT, AND INSTANTANEOUS STRENGTH

The phenolic resins prepared in examples 1 and 2 were each mixed 1:1 with a mixture of 13 parts by weight of DBE and 37 parts by weight of tetraetyl silicate. The resulting phenolic resin component was used for producing test specimens.

A molding material mixture was produced using the phenolic resin component prepared, mold base materials, and a polyisocyanate component. In the cold box process, test specimens in the form of flexural rods were produced as described below, and a determination was made of their initial flexural strengths.

The isocyanate component is prepared by mixing 80 parts of diphenylmethane diisocyanate (for example, Lupranat M20S, BASF), 19 parts of tetraethyl silicate and 1 part of additive according to patent DE 102012201971.

The production of a test specimens (+GF+ standard flexural strength test specimens) is carried out in line with the VDG datasheet P73. For this purpose, the mold base material is charged to a mixing vessel. The phenolic resin component and polyisocyanate component are then weighed into the mixing vessel in such a way that they do not mix directly with one another. Mold base material, the phenolic resin component prepared, and polyisocyanate component are mixed subsequently in a paddle mixer (Multiserw, model RN10/P) for 2 minutes at around 220 revolutions/minute to give a molding material mixture.

The test specimens are produced using a universal core shooting machine LUT equipped with an LUT/G Gasomat, both from Multiserw. Directly after its production as described above, the completed molding material mixture is introduced into the shooting head of the core shooting machine.

The parameters of the core shooting procedure are as follows: shooting time: 3 seconds, delay time after shooting: 5 seconds, shooting pressure: 4 bar (400 kPa). For curing, the test specimens are gassed for 10 seconds at a gassing pressure of 2 bar (200 kPa) with dimethylpropylamine (DMPA). They are subsequently purged with air for 9 seconds with a purging pressure of 4 bar (400 kPa) and determinations were then made of the fracture displacement, the fracture force, and the instantaneous strength of the test specimens produced.

The instantaneous strength is measured using a Multiserw test instrument LRu-2e at defined times (15 seconds, 1 hour, 24 hours; see table 2) after the end of the purge.

The fracture force and fracture displacement are measured using a Multiserw test instrument LRu-DMA at defined times (15 seconds, 1 hour, 24 hours; see table 2) after the end of the purge.

The results of the measurements are reproduced in the table below, table 2.

TABLE 2

|  | 15 s (instant) | 1 h | 24 h |
|---|---|---|---|
| Fracture force [N] | | | |
| Phenolic resin from example 1 | 102 | 161 | 183 |
| Phenolic resin from example 2 | 119 | 162 | 187 |
| Fracture displacement [mm] | | | |
| Phenolic resin from example 1 | 0.87 | 0.48 | 0.55 |
| Phenolic resin from example 2 | 0.62 | 0.46 | 0.53 |
| Instantaneous strength [N/cm$^2$] | | | |
| Phenolic resin from example 1 | 268 | 381 | 390 |
| Phenolic resin from example 2 | 307 | 386 | 426 |

The invention claimed is:

1. A phenolic resin for use in the phenolic resin component of a two-component binder system for the polyurethane cold box process, wherein the phenolic resin comprises:
    (a) a resole having the following structural units:

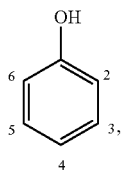

(a1)

where at one, two or three of the positions 2, 4 and 6, instead of a bond to hydrogen, there is a bond to a further structural unit of the resole, (a2) one or more structural units of the formula (A2)

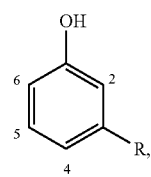

(A2)

where the substituent R is an (a2-i) unsubstituted, (a2-ii) aliphatic, (a2-iii) branched or unbranched, (a2-iv) saturated or unsaturated radical having a total of 5 to 35 carbon atoms, and where at one, two or three of the positions 2, 4 and 6, instead of a bond to hydrogen, there is a bond to a further structural unit of the resole, (a3) one or more structural units of the formula (A3)

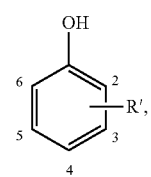

(A3)

where the substituent R' is substituted at position 2 or 4 and is an (a3 i) unsubstituted, (a3-ii) aliphatic, (a3-iii) branched or unbranched, (a3-iv) saturated or unsaturated radical having a total of 1 to 15 carbon atoms, and where at one, two or three of the remaining positions 2, 4 and 6, instead of a bond to hydrogen, there is a bond to a further structural unit of the resole,

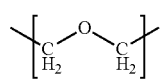

(a4)

as a link connecting two phenol rings,

(a5)

as a link connecting two phenol rings.

2. The phenolic resin as claimed in claim 1, wherein the substituent R in the structural unit or at least in one of the structural units of the formula (A2) is an (a2-i) unsubstituted, (a2-ii) aliphatic, (a2-iii) unbranched radical having a total of 5 to 35 carbon atoms.

3. The phenolic resin as claimed in claim 1, wherein the substituent R in the structural unit or at least in one of the structural units of the formula (A2) is (a2-iv) mono- or polyunsaturated.

4. The phenolic resin as claimed in claim 1, wherein the substituent R in the structural unit or at least in one of the structural units of the formula (A2) is an (a2-i) unsubstituted, (a2-ii) aliphatic, (a2-iii) unbranched radical having a total of 15 carbon atoms which (a2-iv) is triunsaturated.

5. The phenolic resin as claimed in claim 1, wherein the structural units of the formula (A2) is one or more structural units of the formula (A2-A):

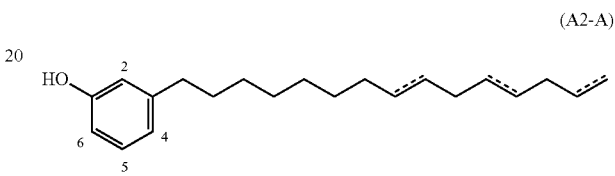

(A2-A)

where one, two or all of the bonds shown with dashes represents a double bond, where at one, two or three of the positions 2, 4 and 6, instead of a bond to hydrogen, there is a bond to a further structural unit of the resole.

6. The phenolic resin as claimed in claim 1, wherein the substituent R' in the structural unit or at least in one of the structural units of the formula (A3) is disposed in ortho-position to the phenolic OH.

7. The phenolic resin as claimed in claim 1, wherein the substituent R' in the structural unit or at least in one of the structural units of the formula (A3) is an (a3-i) unsubstituted, (a3-iii) branched or unbranched, (a3-iv) saturated alkyl radical having 1 to 9 carbon atoms.

8. The phenolic resin as claimed in claim 1, wherein the molar ratio of the structural units a1 to a2 in the resole of the constituent (a) is in the range from 10:1 to 99:1.

9. The phenolic resin as claimed in claim 1, wherein the molar ratio of the structural units a1 to a3 in the resole of the constituent (a) is in the range from 1:1 to 10:1.

10. The phenolic resin as claimed in claim 1, wherein the molar ratio of the structural units a2 to a3 in the resole of the constituent (a) is in the range from 5:1 to 30:1.

11. The phenolic resin as claimed in claim 1, wherein the molar ratio of the structural units a4 to a5 in the resole of the constituent (a) is in the range from 90:10 to 10:90.

12. The phenolic resin as claimed in claim 1, wherein the structural units of the formula (A2) is one or more structural units of the formula (A2-A):

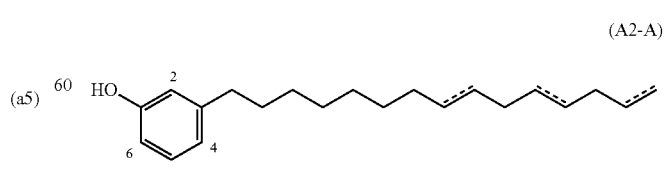

(A2-A)

where one, two or all of the bonds shown with dashes represents a double bond and where
the substituent R' in the structural unit or at least in one of the structural units of the formula (A3) is disposed in ortho-position to the phenolic OH, and the substituent R' represents a methyl group.

13. A phenolic resin component for use as a component of a two-component binder system for the polyurethane cold box process, comprising
a phenolic resin as claimed in claim 1 and also
a solvent for the phenolic resin.

14. A two-component binder system for use in the polyurethane cold box process, comprising a phenolic resin component and an isocyanate component separate from it, wherein the phenolic resin component comprises a phenolic resin as claimed in claim 1.

15. A mixture for curing by contacting with a tertiary amine or with a mixture of two or more tertiary amines, wherein the mixture is preparable by mixing components of the two-component binder system as claimed in claim 14.

16. The phenolic resin as claimed in claim 1 for binding a mold base material or a mixture of mold base materials in the polyurethane cold box process.

17. An article from the group consisting of feeders, foundry molds and foundry cores, producible from a mixture as claimed in claim 15.

18. A process for preparing a phenolic resin, comprising the following steps:
(A) providing or preparing phenol,
(B) providing or preparing one or more compound having the general formula (I)

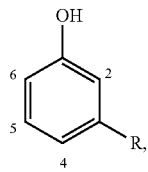

where the substituent R is an (a2-i) unsubstituted, (a2-ii) aliphatic, (a2-iii) branched or unbranched, (a2-iv) saturated or unsaturated radical having a total of 5 to 35 carbon atoms, (C) providing or preparing one or more compound having the general formula (II)

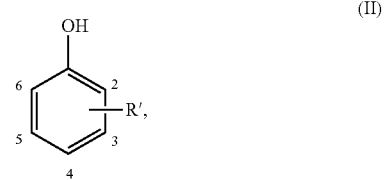

where the substituent R' is substituted at position 2 or 4 and is an (a3 i) unsubstituted, (a3-ii) aliphatic, (a3-iii) branched or unbranched, (a3-iv) saturated or unsaturated radical having a total of 1 to 12 carbon atoms, (D) providing or preparing formaldehyde (E) providing divalent metal ions as metal catalyst, and (F) incorporating by condensation the compounds provided or prepared in steps (A) to (D) using the metal ions provided in step (E) as metal catalyst, wherein the polycondensation takes place in a weakly acidic medium.

19. The phenolic resin as claimed in claim 9, wherein the molar ratio of the structural units a1 to a3 in the resole of the constituent (a) is in the range from 1.5:1 to 3.5:1.

20. The phenolic resin as claimed in claim 10, wherein the molar ratio of the structural units a2 to a3 in the resole of the constituent (a) is in the range from 10:1 to 20:1.

* * * * *